[11] 3,571,572

| [72] | Inventor | Gerald Falbel |
| | | Stamford, Conn. |
| [21] | Appl. No. | 829,219 |
| [22] | Filed | June 2, 1969 |
| [45] | Patented | Mar. 23, 1971 |
| [73] | Assignee | Barnes Engineering Company |
| | | Stamford, Conn. |
| | | Continuation-in-part of application Ser. No. 566,163, July 18, 1966, now abandoned. |

[54] RADIATION BALANCE HORIZON SENSOR WITH AN EARTH TANGENCY MASK
3 Claims, 2 Drawing Figs.

[52] U.S. Cl. ......................................... 250/83.3, 244/1, 250/203
[51] Int. Cl. ............................................. G01p 13/00
[50] Field of Search............................................. 250/83.3 (IR), 203; 244/1

[56] References Cited
UNITED STATES PATENTS

| 3,205,362 | 9/1965 | Dryden........................ | 250/203 |
| 3,239,165 | 3/1966 | Sohn ............................ | 244/1 |
| 3,351,756 | 11/1967 | Kallet et al.................... | 250/83.3(IR) |

*Primary Examiner*—James W. Lawrence
*Assistant Examiner*—Morton J. Frome
*Attorneys*—Robert Ames Norton and Joseph Levinson ABSTRACT: A horizon sensor of the radiation balance type is described with an earth tangency mask so that the horizon sensor detectors are illuminated only by a narrow band of radiation at the horizon of the earth's disc when the horizon sensor is positioned for correct vehicle attitude.

PATENTED MAR 23 1971

3,571,572

INVENTOR.
GERALD FALBEL

BY

ATTORNEY 3,571,572

RADIATION BALANCE HORIZON SENSOR WITH AN EARTH TANGENCY MASK

RELATED APPLICATIONS

This application is a continuation-in-part of my prior application, Ser. No. 566,163, filed Jul. 18, 1966, and now abandoned.

BACKGROUND OF THE INVENTION

Satellites require some sensing means to determine flight attitude of the satellite and to produce error signals which can be utilized for attitude correction mechanisms and for other purposes. The first practical horizon sensors, and still a very useful type, utilize scanning across the earth's disc an comparing attitude by comparing time of passing over the sharp discontinuity between earth and space at the horizon and internally produced signals. Such sensors require moving parts, with concomitant lubrication problems in the vacuum of space. More recently horizon sensors have been developed operating on the radiation balance of fields of view, which sensors have no moving parts and are more satisfactory for use in satellites which may have to operate unattended for long periods of time, a year or more. Such a satellite is a synchronous orbit satellite which remains over one position on earth and which are used for navigational, electromagnetic radiation relay stations and the like. The problem of cold clouds at the horizon has arisen, and resulting errors have been substantially eliminated by utilizing infrared radiation from constituents of the atmosphere, such as the $15\mu$ band of carbon dioxide. Sensors operating on emissions from constituents of the atmosphere are described and claimed in the patent to Kaufman, U.S. Pat. No. 3,118,063, issued Jan. 14, 1964. The operating principle of sensors as described in the Kaufman patent eliminates the effect of cold clouds at the earth's horizon, but it does not completely eliminate thermal gradients across the earth, for example when there are balance sensors with north-south fields. During summer and winter the temperatures over considerable areas will be quite different, and this is true also of the carbon dioxide temperatures, which vary with latitude. It is with the solution of this problem that the present invention deals.

SUMMARY OF THE INVENTION

In the present invention, synchronous satellites and other satellites which have circular orbits at constant altitudes can be provided with radiation balance type horizon sensors according to the present invention which reduce the earth temperature gradient error to an extremely small or negligible amount. Essentially the horizon sensors of the present invention provide an opaque mask, which will be referred to as an "earth tangency mask," so that radiation is received when the satellite is in normal flight and the proper attitude. The earth tangency mask is large enough so that it covers almost the whole of the earth's apparent disc, permitting radiation only from a very narrow strip at the horizon. This means that the areas from which radiation are received are so small in comparison to the earth's disc that thermal gradients on the earth introduce practicably negligible errors, even in the worst case where one horizon is near one pole and the other near the other pole at a season of year where there is a maximum temperature difference between them. The difference between the narrow strips around the earth's horizon and that of space is so enormous that when the satellite is in level flight, the radiation sensors will put out substantially a zero signal regardless of thermal gradients. Of course, if the vehicle is not in level flight, the difference in the amount of radiation from a broader band of earth compared to space is so great that an accurate indication of tilt is achieved.

The present invention is useful with almost any type of radiation balance horizon sensor, but is particularly effective with a simple type sensor in which the imaging optics image the infrared radiation onto a detector array in four cones, the detectors of opposite cones being connected electrically in opposition. This simple type of sensor, in which usually the cones are not pure cones, but the inner surface of pyramids, has many advantages in addition to its simplicity. For example, all radiation can go through a single window, which minimizes thermal differences in different parts of the apparatus, and the earth tangency mask can be arranged very simply in the center, where the four cones come together. This type of radiation balance horizon sensor is therefore preferred, and is the type which will be described in greater detail below. However, of course, the invention is not limited to this exact design of radiation balance sensor. There will also be described a sensor operating on the carbon dioxide radiation band, which also is preferred, but the invention of course is not limited thereto.

Problems have arisen with radiation balance horizon sensors if the sun comes into the field of view, or example near the horizon of the earth. A very effective two-color compensation for such interference is described and claimed in the patent to Kallet and Stanfill, U.S. Pat. No. 3,422,276, assigned to the assignee of the present invention. This modification will be described specifically below in the preferred form of the present invention, although the invention is in no way concerned with whether sun compensation of any kind, or of the two-color variety, is provided.

DESCRIPTION OF THE PREFERRED EMBODIMENT

Figure 1:
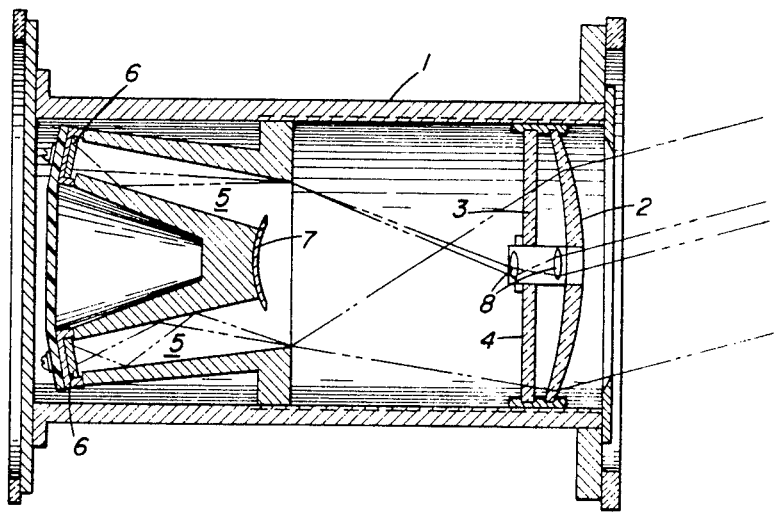
FIG. 1 is a section through the optics and radiation-receiving portion of a horizon sensor.
Figure 2:
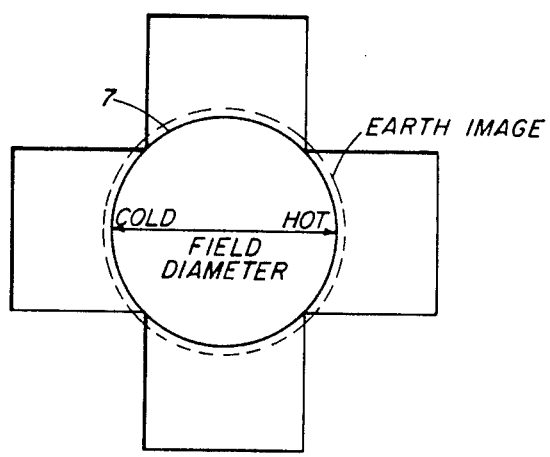
FIG. 2 shows the arrangement of the four fields of view and the earth tangency mask.

The horizon sensor consists of a cylinder 1, which in an actual sensor is provided with suitable thermal insulation, mounting brackets, electronic packages, and the like, but as the present invention does not change the design of these other elements, they are not shown. In the cylinder 1 there is mounted a fast silicon lens 2, for example of speed $f/1.3$. Behind the lens is a window 3 which is provided with a sharp cutting filter 4 such as $14\mu$ cut-on interference filter. It will be noted that all of the radiation passes through this window, and thus temperature gradients within this portion of the instrument are minimized; also, of course, the interference filter more or less restricts the sensor to the radiation from the carbon dioxide band at $15\mu$ and somewhat longer wavelengths. The lens 2 images distant objects in a focal plane at the mouth of four polished cones, or as was mentioned above, strictly speaking, internal pyramids, two of which are shown in FIG. 1, all four fields of view being shown in FIG. 2. The pyramids are numbered 5 and they are, of course, highly polished to constitute excellent mirrors for the infrared radiation in question. At the bottom of each cone is a thermopile 6, opposite thermopiles being connected electrically in opposition as is normal in radiation balance sensors of this type. The polished cones increase the overall speed of the optics so that it corresponds substantially to an $f/0.7$ system.

Where the cones meet there is an opaque curved earth tangency mask 7, the dimensions of which depend on the altitude at which the satellite is going to orbit, in a substantially circular orbit. Only a thin strip at the horizon receives radiation, and of course is tangent to the horizon under level flight conditions. This strip is so small in comparison with the whole earth disc that thermal gradients on earth are substantially eliminated and are completely negligible; for example, in the worst case situation, where one edge of the earth had IR irradiance double the other, a null offset of less than 0.03° would result.

As the presence of a very hot body, such as the sun, in one of the cones' fields would create serious spurious null offset, there are provided two very small lenses 8 in the center of the window 3. These cause a small image of the sun to be imaged in the opposite cone, and this compensates almost perfectly for the effect of the sun's image on the other cone. Because the intensity of radiation from the sun is much greater in the near infrared region, which is transmitted by the two lenses 8, than it is at wavelengths longer than 14μ, the aperture of the lenses 8 is very much smaller than that of the lens 2, and is properly proportioned so that the total infrared energy striking the thermocouples from the two sun images in opposite cones is the same. As has been pointed out above, the two-color sun compensation forms no part of the present invention, and is merely included in the description for completeness in representing the preferred modification of the present instrument. The tangency mask compensates for earth temperature gradients just as effectively in the absence of the sun compensation, but of course such a simplified sensor is subject to possible error when the sun is near the horizon, and therefore in preferred instruments the sun compensation is included, although it has nothing to do with the principles by which the present invention reduces thermal gradients. If there is no danger of the sun intervening, compensation is not needed because other heavenly bodies, even as bright a star as Sirius, contributes too little radiant energy to be of significance.

Thermopiles are shown in the specific description, and are very desirable, and hence preferred, radiation detectors. However, the invention is in no sense limited thereto, and any radiation detectors which are suitable for the wavelength bands of radiation used may be employed, for example thermistor bolometers.

Reference has been made to the particular usefulness of the present invention for synchronous earth satellites, or for earth satellites which move in circular orbits of accurately known altitude. Obviously if the satellite's altitude varies, for example in an elliptical orbit, the tangency mask will only be right for a certain altitude. However, if it is designed for the altitude corresponding to apogee, the band will be considerably larger at the altitude corresponding to perigee, and may be sufficiently wide so that the effect of thermal gradients is not completely compensated within the sensitivity of the instrument. However, even with elliptical orbits, if they are not of too great eccentricity, the compensation obtained by the present invention is helpful and therefore the invention is not absolutely limited to sensors which are to be used with satellites which are moving in circular orbits of constant altitudes.

A simple silicon lens has been shown as the imaging optics. This has much to commend it from the standpoint of compactness, ruggedness, and other factors. However, the earth tangency mask of the present invention will operate with any imaging optics, whether dioptric or catoptric, and hence in its broadest aspect the invention is not limited to the use of a lens.

I claim:

1. In a radiation balance horizon sensor of the type comprising imaging means for imaging distant objects onto radiation detectors connected in opposition for opposed fields of view, the improvement which comprises an opaque mask restricting radiation from a radiating disc at predetermined altitude, located substantially in the focal plane of the imaging means and centrally at the mouths of the conical-type reflecting optics and permitting radiation only from a narrow annulus tangent to the horizon of the radiating disc, whereby thermal gradients on the radiating disc contribute no substantial error to the sensor's null position.

2. A horizon sensor according to claim 1 in which the imaging means is dioptric in the form of a silicon lens and filtering means are provided to restrict radiation to wavelengths longer than about 14μ.

3. A horizon sensor according to claim 1 in which the detectors are mounted in conical-type reflectors and the imaging means images distant objects onto the plane of the mouths of said reflectors.